US012789221B2

(12) United States Patent
Park et al.

(10) Patent No.: US 12,789,221 B2
(45) Date of Patent: Nov. 10, 2026

(54) SLOT DIE COATER

(71) Applicant: LG Energy Solution, Ltd., Seoul (KR)

(72) Inventors: Joon-Sun Park, Daejeon (KR); Jae-Young Sung, Daejeon (KR); Hyun-Sun Yang, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 481 days.

(21) Appl. No.: 18/288,884

(22) PCT Filed: Sep. 30, 2022

(86) PCT No.: PCT/KR2022/014855

§ 371 (c)(1),
(2) Date: Oct. 30, 2023

(87) PCT Pub. No.: WO2023/096137

PCT Pub. Date: Jun. 1, 2023

(65) Prior Publication Data

US 2024/0207885 A1 Jun. 27, 2024

(30) Foreign Application Priority Data

Nov. 26, 2021 (KR) ........................ 10-2021-0166221
Mar. 29, 2022 (KR) ........................ 10-2022-0038990

(51) Int. Cl.
*B05C 5/02* (2006.01)
*H01M 4/04* (2006.01)

(52) U.S. Cl.
CPC .......... *B05C 5/0262* (2013.01); *B05C 5/0254* (2013.01); *B05C 5/027* (2013.01); *H01M 4/0404* (2013.01)

(58) Field of Classification Search
CPC .............................. B05C 5/0254; B05C 5/027
See application file for complete search history.

(56) References Cited

U.S. PATENT DOCUMENTS

2006/0060135 A1 3/2006 Rankin et al.
2008/0274222 A1 11/2008 Cloeren
2008/0274223 A1 11/2008 Cloeren
2011/0287171 A1 11/2011 Seo et al.
(Continued)

FOREIGN PATENT DOCUMENTS

CN 106994823 A 8/2017
CN 109107829 A 1/2019
(Continued)

OTHER PUBLICATIONS

English machine translation of JP2015186791 (Year: 2015).*
(Continued)

*Primary Examiner* — Scott W Dodds
(74) *Attorney, Agent, or Firm* — Lerner David LLP

(57) ABSTRACT

A slot die coater is configured for making a coating width of a multi lane model uniform and reducing a condition adjustment loss in the subsequent production. The slot die coater includes an upper plate; a lower plate; and shims interposed between the upper plate and the lower plate and defining at least two individual lanes to form a slot. The shims defining the individual lanes include a fixing pin to improve positional precision when fixing to the upper plate or the lower plate and a fixing bolt for fixing to the upper plate or the lower plate.

13 Claims, 13 Drawing Sheets

(56) References Cited

U.S. PATENT DOCUMENTS

| | | | |
|---|---|---|---|
| 2012/0027942 A1 | 2/2012 | Joos |
| 2013/0236651 A1 | 9/2013 | Komatsubara et al. |
| 2014/0154421 A1 | 6/2014 | Komatsubara et al. |
| 2019/0118449 A1 | 4/2019 | Greenlund et al. |

FOREIGN PATENT DOCUMENTS

| | | | | |
|---|---|---|---|---|
| CN | 210614182 | U | | 5/2020 |
| CN | 111278573 | A | | 6/2020 |
| CN | 112044680 | A | | 12/2020 |
| JP | 2001029860 | A | | 2/2001 |
| JP | 2001029861 | A | | 2/2001 |
| JP | 3565211 | B2 | | 9/2004 |
| JP | 2004283779 | A | | 10/2004 |
| JP | 2008043875 | A | | 2/2008 |
| JP | 2008073661 | A | | 4/2008 |
| JP | 2008272751 | A | | 11/2008 |
| JP | 2008296078 | A | | 12/2008 |
| JP | 2009112940 | A | | 5/2009 |
| JP | 2013212492 | A | | 10/2013 |
| JP | 2015186791 | A | * | 10/2015 |
| JP | 6330414 | B2 | | 5/2018 |
| KR | 100966708 | B1 | | 6/2010 |
| KR | 20110128589 | A | | 11/2011 |
| KR | 102035826 | B1 | | 10/2019 |

OTHER PUBLICATIONS

International Search Report for PCT/KR2022/014855 mailed Jan. 20, 2023. 3 pages.

Extended European Search Report including Written Opinion for Application No. 22898820.0 dated Jul. 1, 2024, pp. 1-7.

Search Report dated Oct. 28, 2025 from the Office Action for Chinese Application No. 202280014057.X issued Oct. 28, 2025, 3 pages.

* cited by examiner

SLOT DIE COATER

CROSS-REFERENCE TO RELATED APPLICATIONS

The present application is a national phase entry under 35 U.S.C. § 371 of International Application No. PCT/KR2022/014855 filed on Sep. 30, 2022, which claims priority to Korean Patent Application No. 10-2021-0166221 filed on Nov. 26, 2021 in the Republic of Korea and Korean Patent Application No. 10-2022-0038990 filed on Mar. 29, 2022 in the Republic of Korea, the disclosures of which are incorporated herein by reference.

TECHNICAL FIELD

The present disclosure relates to a slot die coater, and more particularly, to a slot die coater with improved shims.

BACKGROUND ART

With the increasing technology development and the growing demand for mobile devices, the demand for secondary batteries as an energy source is rapidly increasing, and a secondary battery essentially includes an electrode assembly which is a power generation element. The electrode assembly includes a positive electrode, a separator and a negative electrode stacked at least once, and the positive electrode and the negative electrode are prepared by coating and drying a positive electrode active material slurry and a negative electrode active material slurry on a current collector made of an aluminum foil and a current collector made of a copper foil, respectively. In general, the secondary battery includes lithium containing cobalt oxide ($LiCoO_2$) of layered crystal structure, lithium containing manganese oxide, for example, $LiMnO_2$ of layered crystal structure and $LiMn_2O_4$ of spinel crystal structure, and lithium containing nickel oxide ($LiNiO_2$) for the positive electrode active material. Additionally, a carbon based material is primarily used as the negative electrode active material, and recently, with the growing demand for high energy lithium secondary batteries, the carbon based material may be mixed with a silicon based material or a silicon oxide based material having the effective capacity that is at least 10 times larger than the carbon based material. For the uniform charging/discharging characteristics of secondary batteries, it is necessary to uniformly coat the positive electrode active material slurry and the negative electrode active material slurry on the current collector, and slot die coaters have been used.

FIG. 1 is an exploded cross-sectional view of a conventional slot die coater, and FIG. 2 is an exploded cross-sectional view of another conventional slot die coater.

Referring to FIG. 1, the slot die coater 1 includes two die blocks 5, 10, and has a slot 20 by a shim 15 between the two die blocks 5, 10. An active material slurry in a manifold 25 leaves an exit port in communication with the slot 20 and is coated on a current collector (not shown).

Referring to FIG. 2, the slot die coater 50 includes three die blocks 55, 60, 65 and a shim 15 is positioned every two die blocks to form two slots 20.

FIG. 3 is a top view of the conventional shim 15 that may be applied to the slot die coaters 1, 50.

A coating width of an active material layer coated on the current collector is determined by the width of the slot 20 of the slot die coaters 1, 50, and since the slot 20 is defined by the shim 15, the width W of the slot 20 is determined by the shape of the shim 15. The shim 15 shown in FIG. 3 is configured to coat, for example, a stripe shaped pattern of three lanes.

FIG. 4 is an enlarged view of section A in FIG. 2. The die block 60 has the manifold 25 inside to hold the active material slurry or a coating solution. A front end 25*a* of the manifold 25, namely, an end facing the exit port has a round shape in cross section.

FIG. 5 shows multi lane coating, for example, three lanes coating using the shim 15 of FIG. 3 mounted in the slot die coater 1 of FIG. 1. When the alignment between the shim 15 and the die blocks 5, 10 is good and there is no deformation in the die blocks 5, 10, the width a of the active material layer on the current collector 70 is equal to the design width W of the shim 15 (a=W).

However, in the event of misassembly of the shim 15, deformation in the die blocks 5, 10 or a large change in properties of the active material slurry for coating, the width of the active material layer coated actually may be different from the design width W of the shim 15.

FIG. 6 shows a change in width of the coating layer on the current collector when the conventional shim is obliquely misassembled. For example, when the shim 15 is obliquely misassembled as shown in FIG. 6, the widths b, b', b" of the plurality of active material layers 75 on the current collector 70 are different from one another and each width b, b', b" is different from the design width W of the shim 15 (b<W). When the shim 15 is misassembled far back from the die blocks 5, 10 as shown at the right bottom in FIG. 6, the width of the active material layer 75 increases as it goes from b to b" (b<b'<b").

When the width mismatch is found, it is necessary to adjust the position of the shim 15 for the uniform width of the multi lane coating layer. However, despite the multi lane, the shim 15 itself is a single (integrated lane) shim, so the adjustment affects all the lanes, making it difficult to adjust only the individual lanes.

Additionally, when changing the die, it is necessary to separate and wash the shim 15, and for the subsequent production, re-assembling and condition adjustment is always necessary. Since the position of the shim 15 is not always the same each assembly, it is necessary to adjust the condition each time the dies are disassembled and washed and then assembled again.

DISCLOSURE

Technical Problem

The present disclosure is designed to solve the above-described problem, and therefore the present disclosure is aimed at making a coating width of a multi lane model uniform and reducing a condition adjustment loss in the subsequent production.

Accordingly, the present disclosure is directed to providing a slot die coater including improved shims.

However, the technical problem to be solved by the present disclosure is not limited to the above problems, and these and other problems will be clearly understood by those skilled in the art from the following description.

Technical Solution

To solve the above-described problem, a slot die coater of the present disclosure includes an upper plate; a lower plate; and a shim interposed between the upper plate and the lower plate and defining at least two individual lanes to form a slot, wherein the shim defining the individual lanes includes a fixing pin to improve positional precision when fixing to the upper plate or the lower plate and a fixing bolt for fixing to the upper plate or the lower plate.

The slot die coater may further include a manifold to hold a coating solution in the lower plate, the shim may be mounted on a land portion in front of the manifold, the fixing pin may be inserted into a pin groove of the lower plate through the shim, and the fixing bolt may be inserted into a fixing bolt groove of the lower plate through the shim.

The shim may have a fixing bolt hole in alignment with the fixing bolt groove, and the fixing bolt hole and the fixing bolt groove may have a margin in a front-rear direction (a delivery direction) and there may have no margin in a left-right direction (a lengthwise direction of the slot die coater perpendicular to the delivery direction).

The upper plate may have an upper plate groove to receive a bolt head of the fixing bolt and a pin head of the fixing pin.

The upper plate groove may be a recess in the upper plate to simultaneously receive the bolt head of the fixing bolt and the pin head of the fixing pin.

A part of the shim in contact with the manifold may be rounded.

According to an example, the round processing is differently applied depending on a location at which the shim is placed on the lower plate. A side of the shim where the coating solution flows may be rounded and a part of the shim in non-contact with the coating solution may not be rounded.

A point of transition from the manifold to the land portion may be right-angled.

Further, an area at which the coating solution flows and exits between the manifold and the land portion may be rounded.

At least three lanes may be defined by the shim and there may be a difference in R value of the round processing between the lane at the center and the lane at the side.

The R value in the lane at the side may be larger than the R value in the lane at the center.

In the present disclosure, there is a height difference between a rear of the manifold and the land portion in front of the manifold by a thickness of the shim.

A lower surface of the upper plate and an upper surface of the lower plate may be coupled without a gap therebetween at the rear of the manifold, the lower surface of the upper plate and an upper surface of the shim may be coupled without a gap therebetween in front of the manifold, and the upper surface of the lower plate and a lower surface of the shim may be coupled without a gap therebetween in front of the manifold.

Advantageous Effects

According to the present disclosure, the shim for multi lane configuration is not a single mass and can be individually separated. Accordingly, when the shim is mounted, only individual lanes are affected and it is possible to adjust for each individual lane.

According to the present disclosure, the shim may be mounted on the land portion in front of the manifold, and fixedly mounted on the lower plate. Since the shim is absent near the manifold, when washing, it is not necessary to separate the shim like the conventional shim. There is no need for a re-assembly process after the separation, thereby reducing the condition adjustment loss.

According to the present disclosure, the part of the shim in contact with the manifold is rounded, and the front end of the manifold at the transition from the manifold to the land portion is right-angled, thereby preventing the generation of a turbulent flow, and achieving a smooth flow of the coating solution.

DESCRIPTION OF DRAWINGS

The accompanying drawings illustrate an exemplary embodiment of the present disclosure and together with the following detailed description, serve to provide a further understanding of the technical aspects of the present disclosure, and thus, the present disclosure is not construed as being limited to the drawings.

BEST MODE

Figure 1:
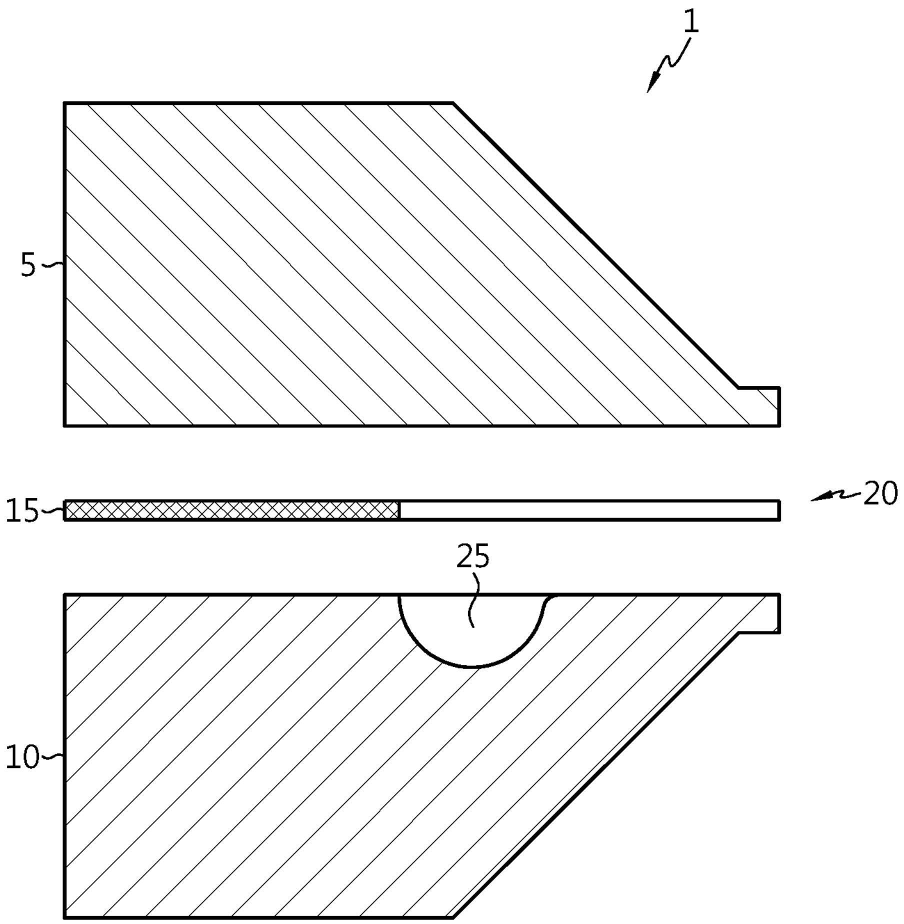
FIG. 1 is an exploded cross-sectional view of a conventional slot die coater.
Figure 2:
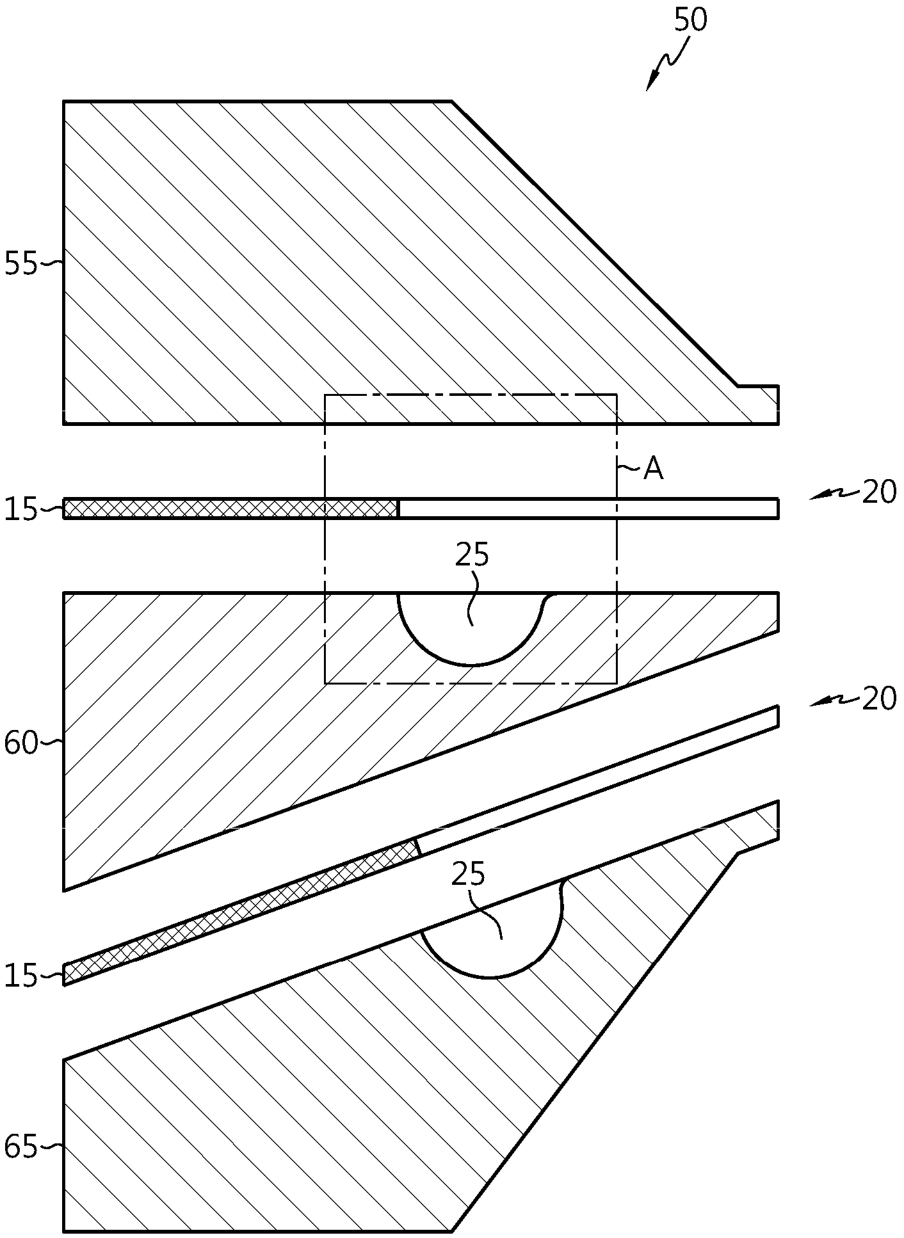
FIG. 2 is an exploded cross-sectional view of another conventional slot die coater.

Hereinafter, an exemplary embodiment of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an exemplary embodiment of the present disclosure and do not fully describe the technical aspects of the present disclosure, so it should be understood that a variety of other equivalents and modifications could have been made thereto at the time of filing the patent application.

Like reference numerals indicate like elements. Additionally, in the drawings, the elements are depicted in exaggerated thickness, proportion and dimension for effective description of the technical subject matter.

The slot die coater of the present disclosure is a device having a slot and used to coat a coating solution on a substrate through the slot. In the following description, 'the substrate' is a current collector and 'the coating solution' is an active material slurry. However, the scope of protection of the present disclosure is not necessarily limited thereto. For example, the substrate may be a porous support for a separator and the coating solution may be an organic matter. That is, where thin film coating is required, any type of substrate and coating solution may be used.

The slot die coater according to the present disclosure includes an upper plate, a lower plate, (at least two) shims defining individual lanes, a fixing pin and a fixing bolt. The slot die coater according to the present disclosure includes (at least two) shims defining individual lanes between an upper plate and an intermediate plate, a fixing pin and a fixing bolt, and (at least two) shims defining individual lanes between the intermediate plate and a lower plate, a fixing pin and a fixing bolt. Hereinafter, it will be described in detail with reference to the accompanying drawings.

Figure 7:
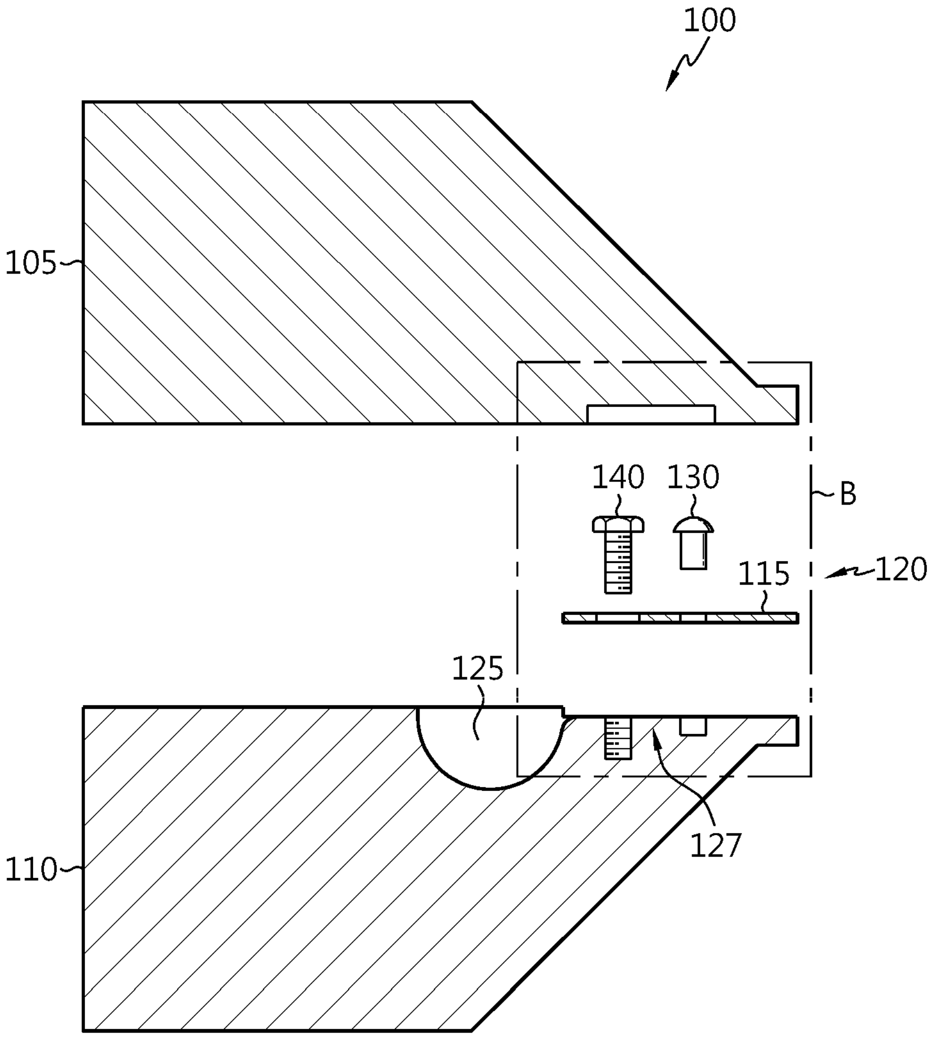
FIG. 7 is an exploded cross-sectional view of a slot die coater according to an embodiment of the present disclosure.
Figure 8:
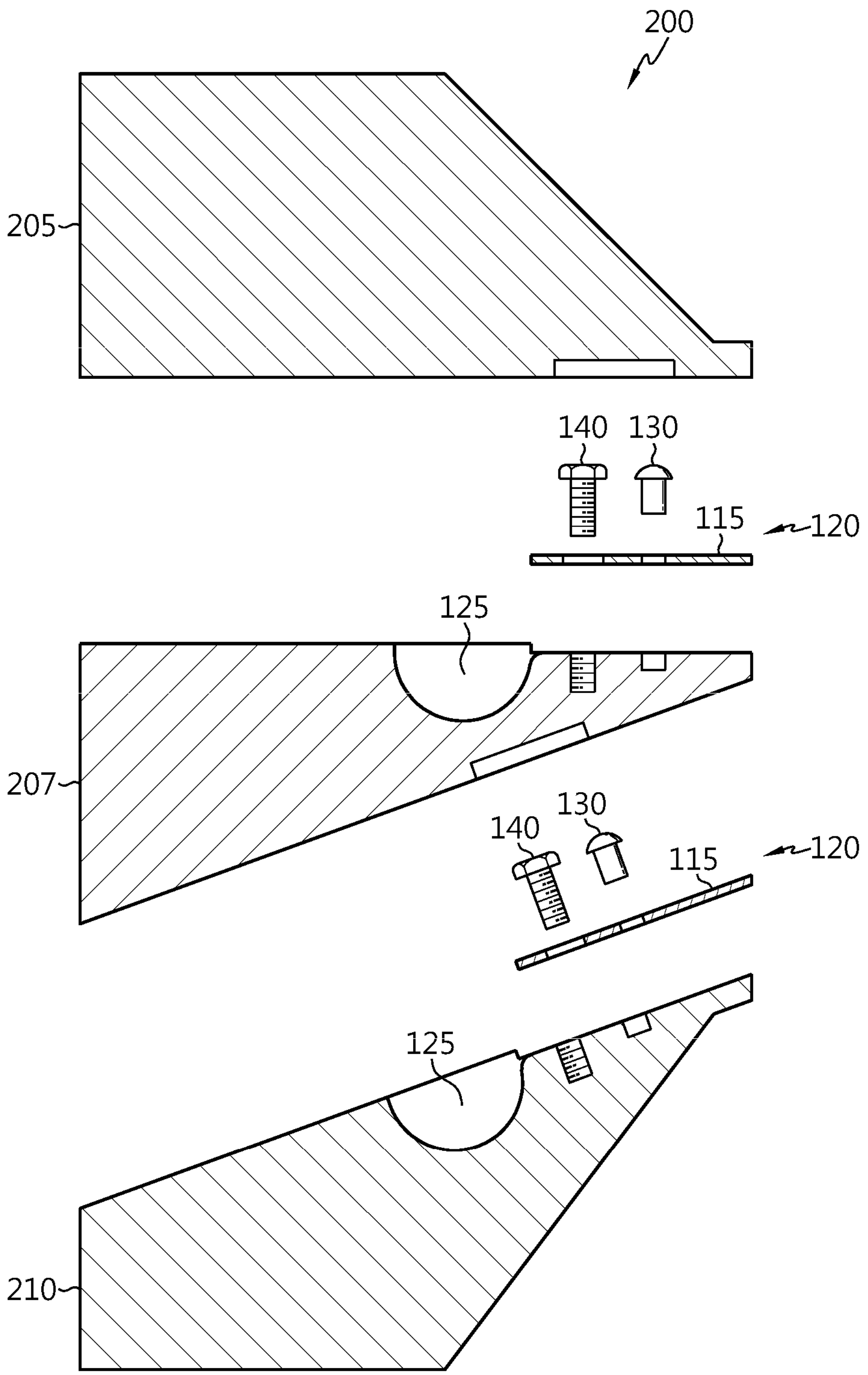
FIG. 8 is an exploded cross-sectional view of a slot die coater according to another embodiment of the present disclosure.
Figure 9:
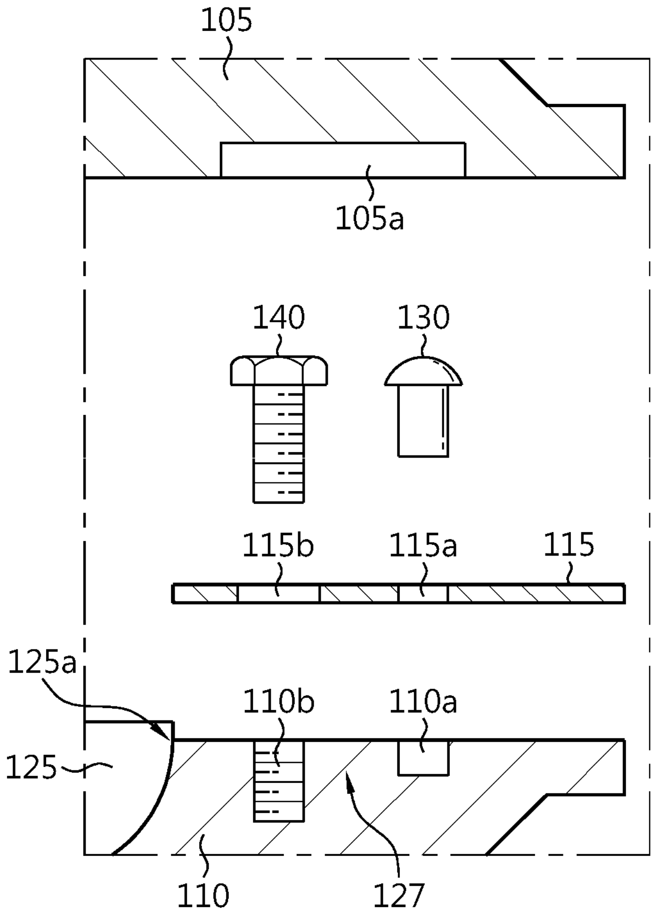
FIG. 9 is an enlarged view of section B in FIG. 7.
Figure 10:
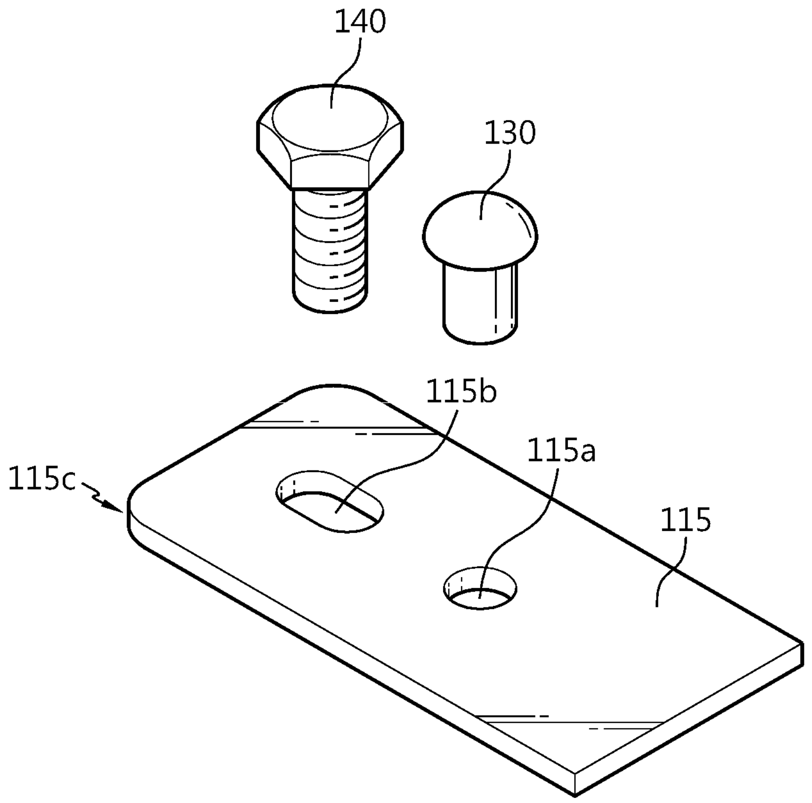
FIG. 10 is a perspective view of a shim defining individual lanes in a slot die coater according to the present disclosure.

FIG. 7 is an exploded cross-sectional view of the slot die coater according to an embodiment of the present disclosure, and FIG. 8 is an exploded cross-sectional view of a slot die coater according to another embodiment of the present disclosure. FIG. 9 is an enlarged view of section B in FIG. 7. FIG. 10 is a perspective view of the shim defining individual lanes in the slot die coater according to the present disclosure.

Referring to FIG. 7, the slot die coater 100 according to an embodiment of the present disclosure includes the upper plate 105, the lower plate 110 and the shim 115 defining individual lanes.

The shim 115 is interposed between the upper plate 105 and the lower plate 110 to form a slot 120. At least two shims 115 are included. When two shims 115 are included, a lane is defined between the two shims 115. When three shims 115 are included, a lane is defined every two adjacent shims 115 and accordingly two lanes are defined. A space between the two adjacent shims 115 defines the slot 120.

A coating solution or an active material slurry may be held in a manifold 125 leaves an exit port in communication with the slot 120 and is coated on the current collector (not shown). Although not shown in the drawing, the manifold 125 is connected to a coating solution supply chamber (not shown) installed outside of the manifold 125 with a feed pipe and is supplied with the coating solution. When the manifold 125 is fully filled with the coating solution, the flow of the coating solution is guided along the slot 120 and leaves the exit port.

The shim 115 is interposed between the upper plate 105 and the lower plate 110 and defines the shape of the slot 120. The shim 115 acts as a gasket except an area in which the exit port is present to prevent leaks of the coating solution in a gap between the upper plate 105 and the lower plate 110 and is preferably made of a material having sealing characteristics.

The shim 115 may be fixed to the upper plate 105 or the lower plate 110. In this embodiment, the shim 115 is fixed to the lower plate 110 for illustration purposes. The shim 115 includes the fixing pin 130 to improve the positional precision when fixing the shim 115 to the lower plate 110. Additionally, the shim 115 includes the fixing bolt 140 for fixing the shim 115 to the lower plate 110. After the shim 115 is fixed to the lower plate 110, the lower plate 110 and the upper plate 105 are combined together and the bolt is installed at the rear part of the lower plate 110 and the upper plate 105 (opposite the area in which the slot 120 is present) to assemble the lower plate 110 with the upper plate 105.

Most of the surfaces of the upper plate 105 may be almost or completely orthogonal to each other, and most of the surfaces of the lower plate 110 may also be almost or completely orthogonal to each other. Since the upper plate 105 and the lower plate 110 have a right angle at the edge between surfaces, there are the right angled portions in cross section and the vertical or horizontal surface that may be used as the reference surface, so it is easy to manufacture or handle and it is possible to ensure precision. Additionally, when combining the upper plate 105 and the lower plate 110 together, facing portions may support each other with high surface contact, thereby achieving improved fixation and maintenance. In addition, when combined together, the upper plate 105 and the lower plate 110 have an approximately rectangular prism shape as a whole, and only the front side where the coating solution exits is inclined toward the substrate. The upper plate 105 and the lower plate 110 are made of, for example, a SUS material. Materials that are easy to process, such as SUS420J2, SUS630, SUS440C, SUS304 and SUS316L, may be used. The SUS is easy to process, inexpensive and highly resistant to corrosion, and can be formed in a desired shape at low cost.

By the slot die coater 100 having the above-described configuration, while the substrate to be coated is being moved by the rotation of a rotatable coating roll (not shown) disposed at the front side of the slot die coater 100, the coating solution may be delivered and continuously coated in contact with the surface of the substrate. Alternatively, pattern coating may be intermittently formed on the substrate by supplying the coating solution and stopping the supply in an alternating manner.

Referring to FIG. 8, a slot die coater 200 according to another embodiment of the present disclosure includes an upper plate 205, a lower plate 210 and an intermediate plate 207 between them. The slot die coater 200 may include the shim 115 as described above between the upper plate 205 ad the intermediate plate 207, and between the intermediate plate 207 and the lower plate 210. Here, at least two shims 115 are included between every two die blocks. The number of shims 115 may change depending on the number of lanes. The manifold 125 may be formed in each of the intermediate plate 207 and the lower plate 210.

Since the slot die coaters 100, 200 are characterized by the shim 115 in common, the slot die coater 100 will be described with reference to FIGS. 7 and 9 to 11. Although the duplicate descriptions are omitted, it will be understood that the description made herein may be equally applied to the slot die coater 200.

Referring to FIGS. 7, 9 and 10, the slot die coater 100 includes the manifold 125 to hold the coating solution in the lower plate 110. The shim 115 is mounted on a land portion 127 in front of the manifold 125.

Since the shim 115 is only present in the land portion 127, there is a difference between the height at the rear of the manifold 125 (opposite the exit port) and the height at the land portion 127 in front of the manifold 125 by the thickness of the shim 115.

The fixing pin 130 may be inserted into a pin groove **110*a* of the lower plate 110 through the shim 115. The fixing bolt 140 may be inserted into a fixing bolt groove 110*b* of the lower plate 110 through the shim 115**.

The shim 115 has a pin hole **115*a* in alignment with the pin groove 110*a*. Additionally, the shim 115 has a fixing bolt hole 115*b* in alignment with the fixing bolt groove 110*b***.

The fixing bolt groove **110*b* and the fixing bolt hole 115*b*** may have a margin in the front-rear direction (delivery direction) and there may have no margin in the left-right direction (lengthwise direction of the slot die coater perpendicular to the delivery direction).

Describing FIGS. 9 and 10 in more detail, the fixing pin 130 is configured to improve the positional precision of the shim 115. The fixing pin 130 passes through the shim 115 via the pin hole 115*a* and is inserted into the pin groove 110*a*, and after inserted, keeps the shim 115 in place. The lower plate 110 and the shim 115 may be accurately aligned through the fixing pin 130. For example, after the fixing pin 130 is inserted to keep the shim 115 in place, the fixing bolt 140 may be installed. When installing the fixing bolt 140, the fixing pin 130 sets its position to prevent the shim 115 from moving.

The fixing bolt 140 is used to fix the shim 115 to the lower plate 110. The fixing bolt 140 passes through the shim 115 via the fixing bolt hole 115*b* and is inserted into the fixing bolt groove 110*b*. Since the fixing bolt hole 115*b* and the fixing bolt groove 110*b* have the margin in the front-rear direction (delivery direction), it is easy to fasten and assemble. Additionally, the absence of the margin in the left-right direction (lengthwise direction of the slot die coater perpendicular to the delivery direction) limits the horizontal movement, thereby fixing the horizontal position.

In this embodiment, the pin hole 115*a* through which the fixing pin 130 passes and the fixing bolt hole 115*b* through which the fixing bolt 140 passes are aligned in a straight line along the front-rear direction (delivery direction). At least one fixing pin 130 and at least one fixing bolt 140 may be included every shim 115. Those skilled in the art will understand that an optimal number and/or various configurations of the fixing pins 130 and the fixing bolts 140 may be used within the scope of the present disclosure.

The fixing pin 130 and the fixing bolt 140 are inserted and received in the pin groove 110*a* and the fixing bolt groove 110*b* through the shim 115 respectively, and the lower surface of the shim 115 is in contact with the upper surface of the lower plate 110 in the land portion 127. The upper surface of the lower plate 110 and the lower surface of the shim 115 may be coupled without a gap between them. Additionally, the lower surface of the upper plate 105 and the upper surface of the lower plate 110 may be coupled without a gap between them at the rear of the manifold 125.

To receive the bolt head of the fixing bolt 140 and the pin head of the fixing pin 130, the upper plate 105 may have an upper plate groove 105*a*. The upper plate groove 105*a* may be present at a corresponding location to receive the bolt head of the fixing bolt 140 and the pin head of the fixing pin 130, but may be a recess in the upper plate 105 to simultaneously receive the bolt head of the fixing bolt 140 and the pin head of the fixing pin 130. When the upper plate groove 105*a* is configured to accommodate each of the bolt head of the fixing bolt 140 and the pin head of the fixing pin 130, positioning the upper plate 105 and the lower plate 110 in place for alignment may be a tedious operation. When the upper plate groove 105*a* is configured to simultaneously accommodate the bolt head of the fixing bolt 140 and the pin head of the fixing pin 130, the bolt head of the fixing bolt 140 and the pin head of the fixing pin 130 are received in the upper plate groove 105*a* with a relatively sufficient clearance, leading to an increase in margin in the position alignment of the upper plate 105 and the lower plate 110. The sufficient alignment margin makes it possible to perform the assembly related subsequent operation such as bolting to assemble the upper plate 105 and the lower plate 110 more smoothly.

Additionally, when the shim 115 is fixed to the lower plate 110 as in this embodiment, the fixing bolt 140 and the fixing pin 130 for fixing do not pass through the upper plate 105. The fixing bolt 140 and the fixing pin 130 are not exposed through the die block. Additionally, the fixing bolt 140 is not installed in the upper plate 105 and is only installed in the lower plate 110. As described above, the fixing bolt 140 and the fixing pin 130 are only assembled/installed in the lower plate 110, and are not assembled/installed in the upper plate 105. Accordingly, to check the condition of the shim 115 or wash the die block, it is only necessary to disassemble the lower plate 110 and the upper plate 105, thereby improving convenience and there is no need to disassemble and re-assemble the whole slot die coater, resulting in easy process management.

When the upper plate groove 105*a* is formed, the bolt head of the fixing bolt 140 and the pin head of the fixing pin 130 are received in the upper plate groove 105*a* and the lower surface of the upper plate 105 and the upper surface of the shim 115 are in contact with each other near the upper plate groove 105*a*. Accordingly, the lower surface of the upper plate 105 and the upper surface of the shim 115 may be coupled without a gap between them. A gap corresponding to the thickness of the shim 115 is formed between the upper plate 105 and the lower plate 110 in front of the manifold 125 and the gap becomes the slot 120.

Figure 11:
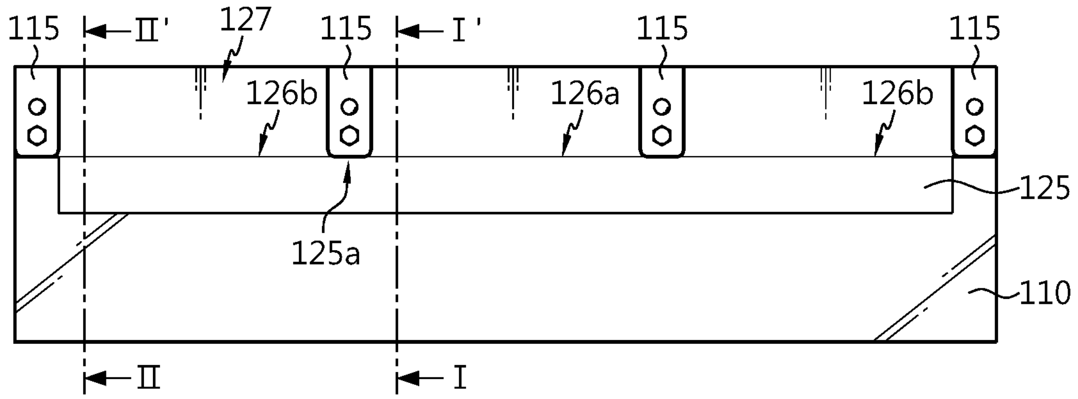
FIG. 11 shows shims defining individual lanes, arranged at a predetermined interval on a lower plate, in a slot die coater according to the present disclosure.

FIG. 11 shows the shims 115 arranged at a predetermined interval on the lower plate 110 in the slot die coater 100 according to the present disclosure. For example, three lanes are defined by four shims 115.

Figure 3:
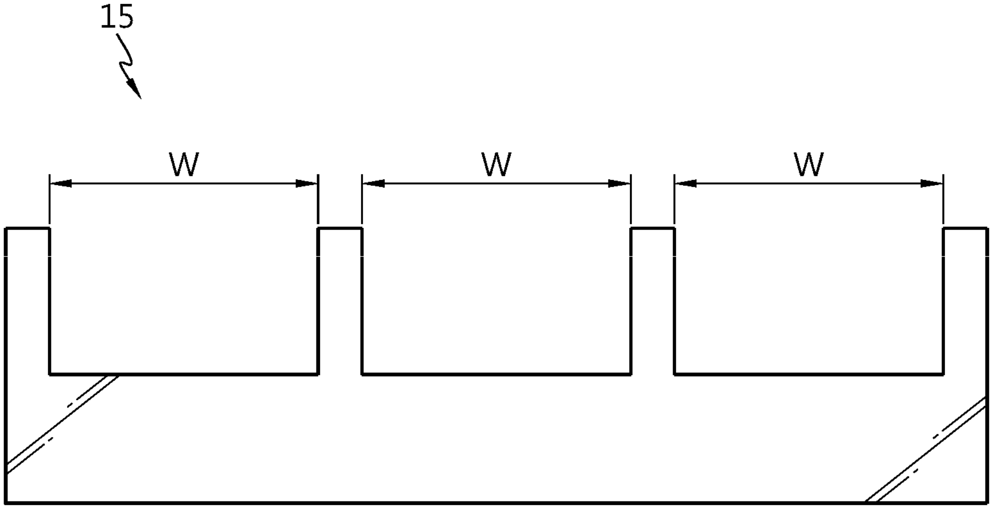
FIG. 3 is a top view of a conventional shim.

According to the present disclosure, since the shim 115 can be individually separated, when mounted, only individual lanes are affected and it is possible to adjust for each individual lane. The shim 115 may be only mounted on the land portion 127 in front of the manifold 125, and may be fixedly mounted on the lower plate 110. Since the shim 115 is absent near the manifold 125, there is no need to separate from the die blocks to wash as opposed to the conventional shim 15 (see FIG. 3). There is no need to re-assemble after the separation, thereby reducing the condition adjustment loss.

As shown in FIGS. 10 and 11, the shim 115 of the present disclosure preferably has a rounded part 115*c* in contact with the manifold 125 to achieve a smooth flow of the coating solution or a fluid, thereby preventing the generation of a turbulent flow.

Figure 4:
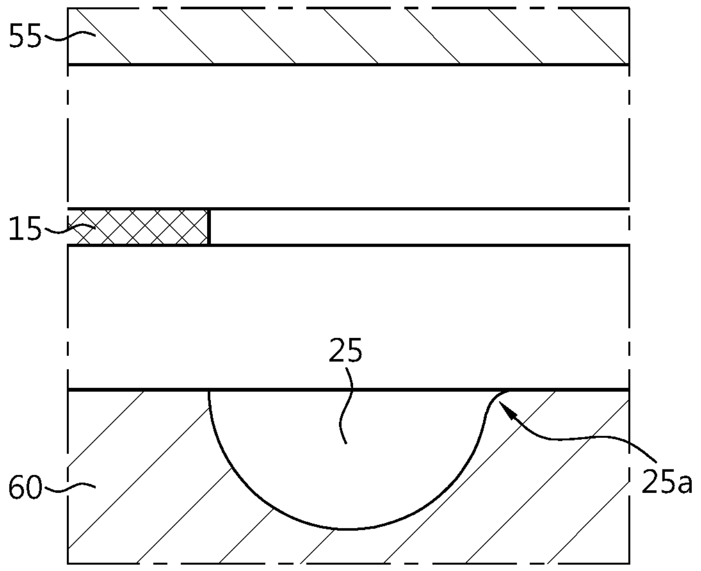
FIG. 4 is an enlarged view of section A in FIG. 2.
Figure 5:
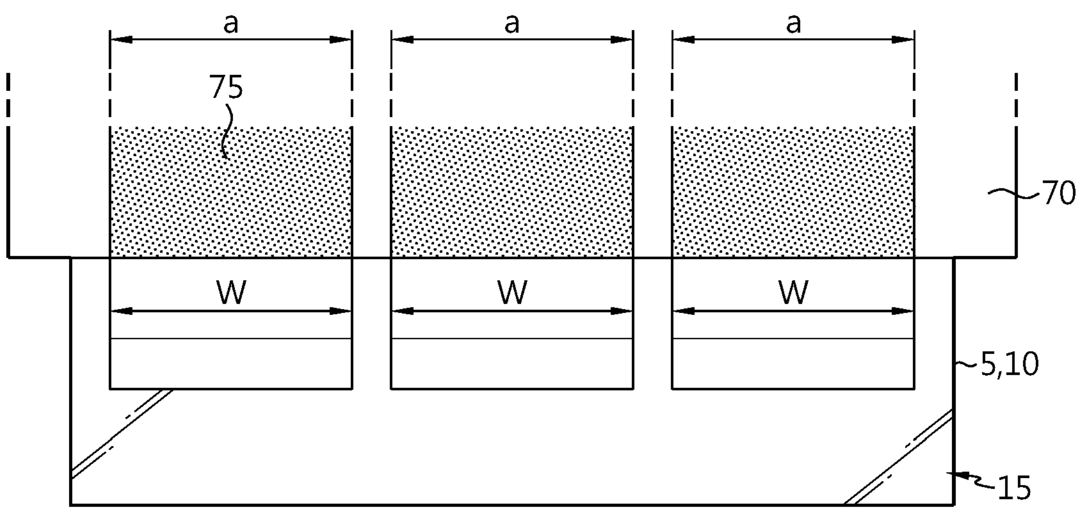
FIG. 5 shows multi lane coating by the mounted shim of FIG. 3.
Figure 6:
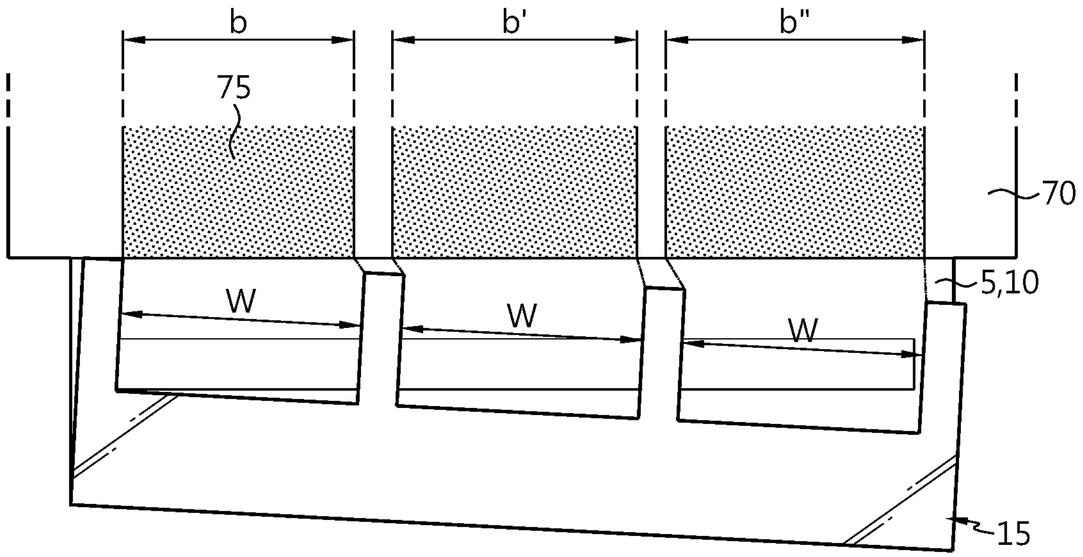
FIG. 6 shows a change in width of a coating layer on a current collector when a conventional shim is obliquely misassembled.

As described with reference to FIG. 4, the conventional slot die coater has the rounded front end 25*a* of the manifold corresponding to the point of transition from the manifold 25 to the land portion. However, the present disclosure has the right-angled front end 125*a* of the manifold corresponding to the point of transition from the manifold 125 to the land portion 127 (in cross section) as shown in FIG. 10. In case that the front end 125*a* of the manifold corresponding to the point of transition from the manifold 125 to the land portion 127 is rounded like the conventional art, it results in low fluid flow.

In the present disclosure, the part 115*c* of the shim 115 in contact with the manifold 125 is rounded, and the front end 125*a* of the manifold corresponding to the point of transition from the manifold 125 to the land portion 127 is right-angled, thereby achieving a smooth flow of the fluid.

Meanwhile, in another embodiment, referring further to FIG. 11, only areas 126*a*, 126*b* corresponding to a location at which the coating solution or the active material slurry flows and exits between the manifold 125 and the land portion 127 may be rounded. As described previously, the front end 125*a* of the manifold is right-angled.

In particular, in the multi lane coating, there may be a difference in R value (i.e., radius of curvature) of round processing between the center and the side as shown in FIG.

Figure 12:
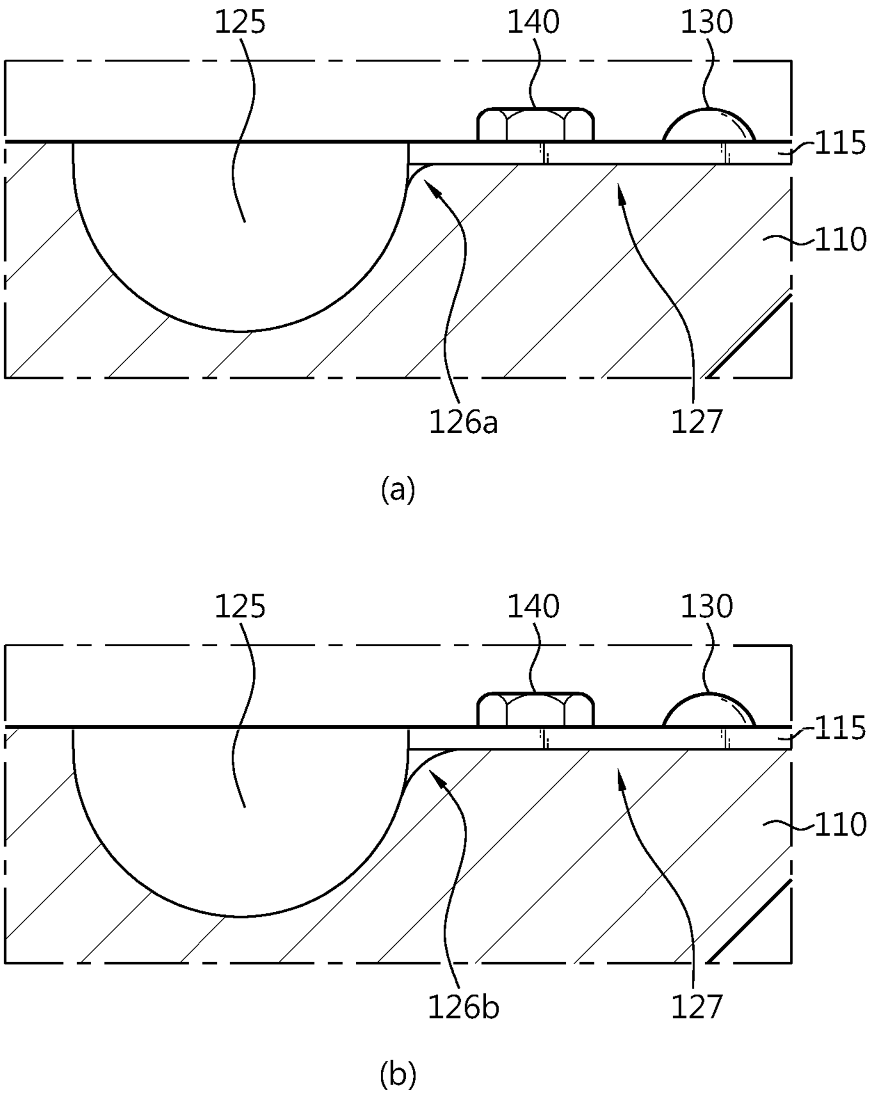
FIG. 12 shows a cross section of a manifold of a slot die coater according to another embodiment of the present disclosure.

12. FIG. 12 shows the cross section of the manifold of the slot die coater according to another embodiment of the present disclosure. In FIG. 12(*a*) is a cross-sectional view of FIG. 11, taken along the line I-I' and (b) is a cross-sectional view of FIG. 11, taken along the line II-II'. Assume that three lanes are defined by the shim 115 as shown in FIG. 11.

Referring to part (a) of FIG. 12, the lane at the center, i.e., the area 126*a* at the center between the manifold 125 and the land portion 127 where the coating solution or the active material slurry flows and exits has a smaller R value. Referring to part (b) of FIG. 12, the lane at the side, i.e., the area 126*b* at the side between the manifold 125 and the land portion 127 where the coating solution or the active material slurry flows and exits has a larger R value. Accordingly, it is possible to reduce a difference in flow rate between the center and the side.

Figure 13:
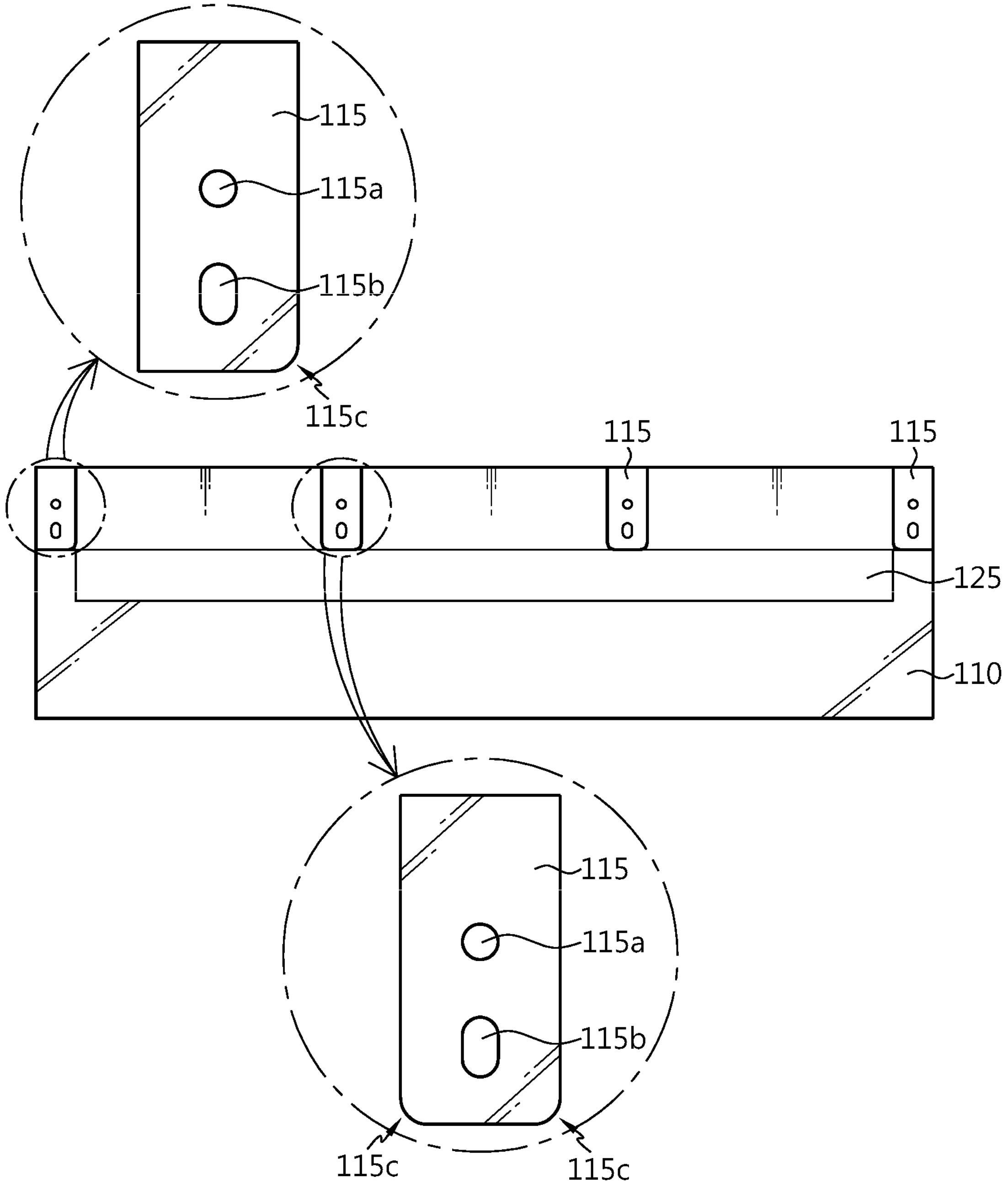
FIG. 13 shows a rounded part of a shim in contact with a manifold in a slot die coater according to the present disclosure.

Meanwhile, FIG. 10 shows that two sides of the part 115*c* of the shim 115 in contact with the manifold 125 are rounded, but the round processing may be differently applied depending on the location at which the shim 115 is placed on the lower plate 110. FIG. 13 shows the rounded part of the shim in contact with the manifold in the slot die coater according to the present disclosure.

Referring to FIG. 13, the shim 115 at the outermost edge, i.e., the side may be rounded at only one side corresponding to the inner side in which the coating solution or the active material slurry flows. The outer side in non-contact with the coating solution may not be rounded. The shim 115 at the center may be rounded at the two sides where the coating solution flows. Accordingly, it is possible to further reduce the turbulent flow risk in the corresponding area.

For example, the positive electrode active material slurry may be coated using the slot die coater 100 of the present disclosure to manufacture positive electrodes of secondary batteries. The positive electrode includes a current collector and a positive electrode active material layer on the surface of the current collector. The current collector may include electrically conductive materials, for example, Al and Cu, and a suitable one may be used according to the polarity of the current collector electrode known in the field of secondary batteries. The positive electrode active material layer may further include at least one of a plurality of positive electrode active material particles, a conductive material or a binder. Additionally, the positive electrode may further include various types of additives to supplement or improve the electrical and chemical properties.

The active material is not limited to a particular type and may include any type of active material that can be used for positive electrode active materials of lithium ion secondary batteries. Its non-limiting example may include at least one of layered compounds or compounds with one or more transition metal substitution such as lithium manganese composite oxide ($LiMn_2O_4$, $LiMnO_2$), lithium cobalt oxide ($LiCoO_2$), lithium nickel oxide ($LiNiO_2$); lithium manganese oxide of formula $Li_{1+x}Mn_{2-x}O_4$ (x is 0~0.33), $LiMnO_3$, $LiMn_2O_3$, $LiMnO_2$; lithium copper oxide ($Li_2CuO_2$); vanadium oxide, for example, $LiV_3O_8$, $LiV_3O_4$, $V_2O_5$, $Cu_2V_2O_7$; Ni site lithium nickel oxide represented by formula $LiNi_{1-x}M_xO_2$ (M=Co, Mn, Al, Cu, Fe, Mg, B or Ga, x=0.01~0.3); lithium manganese composite oxide represented by formula $LiMn_{2-x}M_xO_2$ (M=Co, Ni, Fe, Cr, Zn or Ta, x=0.01~ 0.1) or $Li_2Mn_3MO_8$ (M=Fe, Co, Ni, Cu or Zn); $LiMn_2O_4$ with partial substitution of alkali earth metal ion for Li in the formula; disulfide compounds; or $Fe_2(MoO_4)_3$. In the present disclosure, the positive electrode may include a solid electrolyte material, for example, at least one of a polymer based solid electrolyte, an oxide based solid electrolyte or a sulfide based solid electrolyte.

The conductive material may be typically added in an amount of 1 wt % to 20 wt % based on the total weight of the mixture including the active material. The conductive material is not limited to a particular type, and may include any material having conductive properties without causing any chemical change to the corresponding battery, for example, at least one selected from graphite, for example, natural graphite or artificial graphite; carbon black, for example, carbon black, acetylene black, ketjen black, channel black, furnace black, lamp black, thermal black; conductive fibers, for example, carbon fibers or metal fibers; metal powder, for example, carbon fluoride, aluminum and nickel powder; conductive whiskers, for example, zinc oxide and potassium titanate; conductive metal oxide, for example, titanium oxide; and conductive materials, for example, polyphenylene derivatives.

The binder is not limited to a particular type and may include any material which assists in binding the active material and the conductive material together and binding to the current collector, for example, polyvinylidene fluoride polyvinylalcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluoro rubber and a variety of copolymers thereof. The binder may be typically included in the range of 1 wt % to 30 wt % or 1 wt % to 10 wt % based on 100 wt % of the electrode layer.

The negative electrode active material slurry may be coated using the slot die coater 100 of the present disclosure to manufacture negative electrodes of secondary batteries. The negative electrode includes a current collector and a negative electrode active material layer on the surface of the current collector. The negative electrode active material layer may further at least one of a plurality of negative electrode active material particles, a conductive material or a binder. Additionally, the negative electrode may further include a variety of additives to supplement or improve the electrical and chemical properties.

The negative electrode active material may include carbon materials, for example, graphite, amorphous carbon, diamond-like carbon, fullerene, carbon nanotubes and carbon nanohorns, lithium metal materials, alloy based materials, for example, silicon or tin alloy based materials, oxide based materials, for example, $Nb_2O_5$, $Li_5Ti_4O_{12}$, $TiO_2$, or a composite thereof. For the details of the conductive material, the binder and the current collector of the negative electrode, reference may be made to the description of the positive electrode.

The active material slurry including the positive electrode active material or the negative electrode active material has very high viscosity. For example, the viscosity may be 1000 cps or more. The viscosity of the active material slurry used to form electrodes of secondary batteries may be 2000 cps to 30000 cps. For example, the viscosity of the negative electrode active material slurry may be 2000 cps to 4000 cps. The viscosity of the positive electrode active material slurry may be 8000 cps to 30000 cps. Since it is necessary to coat the coating solution having the viscosity of 1000 cps or more, the slot die coater 100 of the present disclosure is different in structure from devices for coating any other coating solution having lower viscosity, for example, an ordinary resin solution such as a photosensitive emulsion, a magnetic solution, an antireflection or antiglare solution, a solution for enlarging the field of view and a pigment solution for a color filter and cannot be arrived at by design modification. Since the slot die coater 100 of the present disclosure are, for example, designed to coat the active material slurry comprising the active material having the average particle size of about 10 μm, its structure is different from those of devices for coating any other coating solution including no particles having the above-described particle size, and cannot be arrived at by design modification. The slot die coater 100 of the present disclosure is the optimal coater for the manufacture of electrodes.

While the foregoing description has been made based on the slot die coater 100, the configuration related to the shim 115 may be equally applied to the slot die coater 200. Referring back to FIG. 8, the description related to the upper plate 105 and the lower plate 110 of the slot die coater 100 and the shim 115 between them is equally applied to the upper plate 205 and the intermediate plate 207 of the slot die coater 200 and the shim 115 between them. For example, the pin groove 110*a* and the fixing bolt groove 110*b* of the lower plate 110 are formed in the intermediate plate 207. Additionally, the description related to the upper plate 105 and the lower plate 110 of the slot die coater 100 and the shim 115 between them is equally applied to the intermediate plate 207 and the lower plate 210 of the slot die coater 200 and the shim 115 between them. The shim 115 between the upper plate 205 and the intermediate plate 207 and the shim 115 between the intermediate plate 207 and the lower plate 210 may be disposed at vertically aligned locations.

Meanwhile, the slot die coaters 100, 200 are installed such that the delivery direction of the coating solution or the electrode active material slurry is almost horizontal (almost ±5°). However, the present disclosure is not limited to the exemplary configuration, and for example, may have vertical die configuration to deliver the electrode active material slurry from bottom to top, i.e., in the opposite direction of gravity.

While the present disclosure has been hereinabove described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

| [Description of Reference Numerals] | |
|---|---|
| 100, 200: Slot die coater | 105, 205: Upper plate |
| 105a: Upper plate groove | 110, 210: Lower plate |
| 110a: Pin groove | 110b: Fixing bolt groove |
| 115: Shim | 115a: Pin hole |
| 115b: Fixing bolt hole | 120: Slot |
| 125: Manifold | 127: Land portion |
| 130: Fixing pin | 140: Fixing bolt |
| 207: Intermediate plate | |

What is claimed is:

1. A slot die coater, comprising:

an upper plate;

a lower plate;

a plurality of shims interposed between the upper plate and the lower plate to form a slot, each of the plurality of shims being fixed to one of the lower or upper plates; and a manifold to hold a coating solution in the lower plate, wherein each of the plurality of shims includes a respective fixing pin configured to improve positional precision when fixing the respective shim to the lower or upper plate and a respective fixing bolt configured for fixing the respective shim to the lower or upper plate, wherein each of the plurality of shims is mounted on a land portion of the lower plate adjacent to the manifold, wherein each of the plurality of fixing bolts is inserted into a respective fixing bolt groove of the lower plate through a respective one of the plurality of shims, and wherein each of the plurality of shims has a respective fixing bolt hole configured to align with a respective one of the plurality of fixing bolt grooves, and each of the plurality of fixing bolt holes is an elongated hole having a margin in a widthwise direction of the slot die coater, and no margin in a lengthwise direction of the slot die coater, wherein the widthwise direction is a delivery direction of the coating solution, and wherein the widthwise direction is perpendicular to the lengthwise direction.

2. The slot die coater according to claim 1, wherein each of the plurality of fixing pins is inserted into a respective pin groove of the lower plate through a respective one of the plurality of shims.

3. The slot die coater according to claim 1, wherein the upper plate has a plurality of upper plate grooves, wherein each of the plurality of upper plate grooves is configured to receive a respective one of a plurality of bolt heads of the plurality of fixing bolts and a respective one of a plurality of pin heads of the plurality of fixing pins.

4. The slot die coater according to claim 3, wherein each of the plurality of upper plate grooves is a recess in the upper plate configured to simultaneously receive the respective one of the plurality of bolt heads and the respective one of the pin heads.

5. The slot die coater according to claim 1, wherein each of the plurality of shims has a rounded edge on a rounded side configured to be in contact with the manifold.

6. The slot die coater according to claim 5, wherein the rounded side of various ones of the plurality of shims have two of the rounded edges configured to be in contact with the manifold.

7. The slot die coater according to claim 6, wherein the rounded side of each of the plurality of shims is configured to be in contact with a coating solution flow, and wherein an opposite side to the rounded side of each of the plurality of shims is arranged so as not to contact the coating solution flow.

8. The slot die coater according to claim 1, wherein a transition point from the manifold to the land portion is a right-angle.

9. The slot die coater according to claim 8, wherein an area at which the coating solution exits the manifold and enters the land portion is rounded.

10. The slot die coater according to claim 9, wherein at least three lanes are defined by the plurality of shims, and wherein there is a difference in radius of curvature of the area between a lane at a center and a lane at a side.

11. The slot die coater according to claim 10, wherein the radius of curvature in the lane at the side is larger than the radius of curvature in the lane at the center.

12. The slot die coater according to claim 1, wherein there is a height difference between a rear end portion of the manifold and a land portion of the lower plate disposed adjacent to a front end portion of the manifold by a thickness of one of the plurality of shims.

13. The slot die coater according to claim 12, wherein a lower surface of the upper plate and an upper surface of the lower plate are coupled without a gap therebetween at the rear end of the manifold, the lower surface of the upper plate and an upper surface of each of the plurality of shims are coupled without a gap therebetween at the land portion, and an upper surface of the land portion and a lower surface of each of the plurality of shims are coupled without a gap therebetween.

* * * * *